(12) United States Patent
Sreenivas et al.

(10) Patent No.: US 11,601,052 B2
(45) Date of Patent: Mar. 7, 2023

(54) CURRENT EMULATION IN A POWER SUPPLY

(71) Applicant: Infineon Technologies Austria AG, Villach (AT)

(72) Inventors: Venkat Sreenivas, Winchester, MA (US); Robert T. Carroll, Andover, MA (US); Charles P. Amirault, Nashua, MA (US); James R. Garrett, Windham, NH (US)

(73) Assignee: Infineon Technologies Austria AG, Villach (AT)

( * ) Notice: Subject to any disclaimer, the term of this patent is extended or adjusted under 35 U.S.C. 154(b) by 126 days.

(21) Appl. No.: 16/857,450

(22) Filed: Apr. 24, 2020

(65) Prior Publication Data

US 2021/0336543 A1 Oct. 28, 2021

(51) Int. Cl.
*H02M 3/156* (2006.01)
*H02M 1/00* (2006.01)
*H02M 3/157* (2006.01)

(52) U.S. Cl.
CPC ....... *H02M 3/1566* (2021.05); *H02M 1/0009* (2021.05); *H02M 1/0025* (2021.05); *H02M 3/157* (2013.01)

(58) Field of Classification Search
CPC . H02M 1/0025; H02M 1/0009; H02M 3/1566
See application file for complete search history.

(56) References Cited

U.S. PATENT DOCUMENTS

| 8,692,535 | B1* | 4/2014 | Sreenivas | H02M 3/156 |
| | | | | 323/285 |
| 9,219,414 | B2* | 12/2015 | Shao | H02M 3/158 |
| 11,011,984 | B2* | 5/2021 | Sun | H02M 3/158 |
| 2005/0207181 | A1* | 9/2005 | Halberstadt | H02M 3/156 |
| | | | | 363/16 |

(Continued)

FOREIGN PATENT DOCUMENTS

| EP | 1514341 A1 | 3/2005 |
| WO | 03103122 A1 | 12/2003 |

OTHER PUBLICATIONS

EP Extended Search Report, EP 21169733.9, dated Sep. 16, 2021, pp. 1-10.

*Primary Examiner* — Gustavo A Rosario-Benitez
(74) *Attorney, Agent, or Firm* — Armis IP Law, LLC

(57) ABSTRACT

An apparatus comprises an emulator and a corresponding compensator. During operation, the emulator produces, at different instants of time, an emulated output current value representative of an amount of current supplied from an output voltage to a load. In general, the compensator provides selective compensation to the emulated output current value over time. For example, for a first time duration, compensation adjustments from the compensator are used to modify the emulated output current value. For a second duration of time, compensation adjustments from the compensator are not used to modify the emulated output current value. Disabling or discontinuing application of adjustments (such as based on the actual measured output current) during the second time duration (such as during a respective transient condition) provides more accurate and timely generation of a respective emulated output current value.

40 Claims, 10 Drawing Sheets

(56) References Cited

U.S. PATENT DOCUMENTS

| | | | |
|---|---|---|---|
| 2010/0302818 A1* | 12/2010 | Chang | H02M 1/4225 |
| | | | 363/80 |
| 2011/0316508 A1* | 12/2011 | Cheng | H02M 3/1588 |
| | | | 323/282 |
| 2012/0223692 A1* | 9/2012 | Prodic | H02M 3/1584 |
| | | | 323/283 |
| 2014/0232360 A1 | 8/2014 | Dally | |
| 2014/0285169 A1* | 9/2014 | Zhang | H05B 45/325 |
| | | | 323/282 |
| 2014/0292300 A1* | 10/2014 | Yan | H02M 3/156 |
| | | | 323/288 |
| 2015/0069990 A1 | 3/2015 | Feldtkeller | |
| 2015/0077074 A1* | 3/2015 | Rahimi | H02M 3/1588 |
| | | | 323/271 |
| 2015/0117074 A1* | 4/2015 | Miao | H02M 1/4225 |
| | | | 363/44 |
| 2015/0366010 A1* | 12/2015 | Mao | H05B 45/10 |
| | | | 315/223 |
| 2016/0036326 A1* | 2/2016 | Sreenivas | H02M 3/158 |
| | | | 323/271 |
| 2019/0146569 A1* | 5/2019 | Nge | H02M 3/158 |
| | | | 713/320 |
| 2021/0099080 A1* | 4/2021 | Chen | H02M 3/155 |
| 2021/0159788 A1* | 5/2021 | Kasturi | G01R 19/2509 |
| 2022/0014102 A1* | 1/2022 | Sreenivas | H02M 3/1582 |

* cited by examiner

CURRENT EMULATION IN A POWER SUPPLY

BACKGROUND

One type of conventional power converter is a buck converter. A so-called Constant ON Time (COT) switching buck regulator has a fixed ON-time and uses off-time Pulse Width Modulation (PWM) or overall frequency modulation to regulate an output voltage. In general, to maintain an output voltage within a desired range, the buck converter compares the magnitude of a generated output voltage to a setpoint reference voltage to control respective switch circuitry (such as a control switch and synchronous switch) in the power converter.

In digital voltage regulators that do not implement load line regulation, a physical measurement of the output current consumed by a load is primarily used for telemetry and current balance purposes in multi-phase applications. In such instances, a corresponding analog-to-digital converter (ADC) that monitors the output current tends to be slow, with a slow update rate.

BRIEF DESCRIPTION

If a load line regulation feature is implemented in a power converter application, the reference voltage used to provide the regulation becomes a function of the output current. In one instance of implementing load line regulation, this means that the corresponding analog-to-digital converter used to physically measure the output current must be upgraded to a faster analog-to-digital converter if a fast response is desired. The update rate of the respective analog-to-digital converters is typically a multiple of the switching frequency.

This disclosure includes the observation that conventional power supply monitoring and control techniques suffer from deficiencies. For example, as previously discussed, it is often difficult but desirable to precisely know how much current is delivered by a respective power converter to a load in order to generate appropriate power supply control signals. Implementation of load-line regulation and a corresponding high speed analog-to-digital converter (such as to quickly and precisely measure the output current as previously discussed) increases the cost as well as power consumption of a conventional power supply.

Embodiments herein include novel ways of tracking current delivered by a power converter to a load and controlling generation of a respective output voltage.

More specifically, embodiments herein include an apparatus comprising an emulator and a corresponding compensator. During operation, the emulator produces, at different instants of time, an emulated output current value representative of an amount of current supplied from an output voltage to a load. As its name suggests, the compensator provides compensation to the emulated output current value over time. For example, in one embodiment, for a first time duration, the compensator enables (or provides) adjustments to the emulated output current value based on measurements of the supplied current. For a second duration of time, the compensator disables (or prevents) adjustments to the emulated output current value based on measurements of the supplied current.

Disabling of the compensator and corresponding application of adjustments in one or more windows of time provides more accurate generation of a respective emulated output current value, especially during transient conditions in which the load experiences a change in current consumption. In one embodiment, output current emulation and disabling of the compensator in different windows of times provides a more accurate measurement of the output current, alleviating the need for a fast analog-to-digital converter to physically measure the magnitude of the output current.

Further embodiments herein include, via the compensator, temporarily disabling the adjustments to the emulated output current value in response to detecting a trigger condition in which the output current experiences a transient (such as spike) current consumption condition.

Yet further embodiments herein include a monitor resource. The compensator disables the adjustments to the emulated output current value in response to the monitor resource detecting a trigger condition in which the load powered by the output voltage experiences a transient current consumption condition.

In accordance with further example embodiments, the monitor resource is configured to monitor any suitable one or more parameters to detect the trigger condition that controls compensation. For example, in one embodiment, the monitor resource monitors a frequency of controlling operation of a power converter that produces the output voltage. The compensator disables the adjustments to the emulated output current value in response to detecting a change in the frequency or corresponding period.

Note that, in one embodiment, the monitor resource senses the occurrence of a trigger event or condition (such as a sudden change in output current consumed by the load via the output voltage) in any suitable manner. For example, in one embodiment, the monitor resource detects deviations of the output voltage with respect to the reference voltage; the polarity of these deviations can be used as indicators of a transient event; etc.

In yet further example embodiments, the power converter operates in a constant on time (COT) control mode. In such an instance, as its name suggests, the duration of activating a respective control switch (high side switch circuitry) of a switching power supply is constant while a respective controller adjusts the switching frequency of controlling the high side switch circuitry. In one embodiment, the deviation of the switching frequency from a baseline value (such as steady state value, reference value, etc.) and/or change in corresponding polarity (such as positive or negative deviations) indicates a respective transient event (sudden increase or decrease) in current consumption by the load.

Thus, embodiments herein include a compensator that utilizes the emulated current output value to control operation of a power converter operating in a constant ON-time control mode; the power converter generates the output voltage to power the load based at least in part on the emulated output current value.

In yet further example embodiments, the power converter produces the output voltage based on output of a reference voltage generator. During both the first time duration and the second time duration, the reference voltage generator as described herein derives a reference voltage setpoint signal based on a magnitude of the emulated current output value. A controller in the power converter regulates generation of the output voltage based on the derived reference voltage setpoint signal. As previously discussed, the emulator produces the emulated output current value based on pure emulation (i.e., without compensation) during transient conditions because the emulated output current value is more accurate than a physical output current measurement.

Further embodiments herein include, via the power converter and corresponding controller, implementing load-line regulation during conversion of an input voltage into the output voltage driving the load.

In yet further example embodiments, the emulator as described herein produces the emulated current output value based on an inductance of a power converter converting an input voltage into the output voltage.

In further example embodiments, the emulator as described herein includes an emulation current information generator that produces inductor current emulation information for each of multiple sample times. The emulator uses the inductor current emulation information as a basis to produce the emulated output current value. For example, via the adjustments generated by the compensator, the compensator biases a magnitude of the emulated output current value to track a magnitude of the actual measurements of the supplied current. This ensures that the emulated output current value generally tracks the actual output current supplied by the power converter to the load.

In one embodiment, the inductor current emulation information specifies estimated changes in the amount of current supplied from the output voltage to the load for each of multiple sample times. The emulation information generator generates the estimated changes in the amount of current supplied from the voltage across an inductor (of the power converter) for each of multiple sample times depending on switch control states of a respective power converter generating the output voltage. In one embodiment, the emulation information generator produces the emulation information based on a combination of the switch control states and monitored power supply parameters such as input voltage, output voltage, etc.

Via the emulation information, the emulator estimates changes in the amount of output current to the load for each of multiple sample times and derives the emulated current output value from the estimated changes during both the first time duration and the second time duration. As previously discussed, in certain time durations when no compensation is applied, the actual measurement of the output current is not used to derive the emulated output current value.

Yet further embodiments herein include an analog-to-digital converter and corresponding circuitry that produces the actual measurements of the current supplied by the output voltage to the load. This can include measuring the voltage across the inductor of the corresponding power converter and implementing DCR measurements.

In one embodiment, the compensator biases the emulated output current value. Via biasing of the emulated output current value based on the actual measurements, the compensator ensures that the emulated current output value produced by the emulator is a more accurate representation of the amount of current supplied from the output voltage to the load than merely the actual measurements of the supplied current itself, which is prone to errors for short durations when there are transient output current conditions.

Note that further embodiments herein include a timer. In such an instance, in one nonlimiting example embodiment the timer causes generation of the emulated current output value to be based on the actual measurements of the output current after an amount of time following the second time duration of disabling the adjustments.

As previously discussed, embodiments herein are useful over conventional techniques. For example, disabling or discontinuing compensation adjustments to the emulated output current value and operating in a substantially pure emulation mode during transient conditions results in a more accurate output current value that is subsequently used to control conversion of the input voltage into the output voltage. Embodiments herein include digital emulation of output current to implement the load line feature without a fast analog-to-digital converter (ADC). More specifically, in one embodiment, the ADC implemented to measure actual current is not only implemented as a low update rate, but the output current measurement signal from the ADC is also potentially heavily filtered. As previously discussed, the output current of a respective power converter is emulated based on monitored values such as input voltage Vin, output voltage Vout, a programmed L value (associated with the inductor component), and the sensing of transient current consumption such as load step and load release conditions.

These and other more specific embodiments are disclosed in more detail below.

Note that although embodiments as discussed herein are applicable to power converters, the concepts disclosed herein may be advantageously applied to any other suitable topologies as well as general power supply control applications.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to methods, systems, computer program products, etc., that support operations as discussed herein.

One embodiment herein includes a computer readable storage medium and/or system having instructions stored thereon. The instructions, when executed by computer processor hardware, cause the computer processor hardware (such as one or more co-located or disparately located processor devices) to: produce, at different instants of time, an emulated current output value representative of an amount of current supplied from an output voltage to a load; for a first time duration, provide (compensation) adjustments to the emulated current output value based on actual measurements of the supplied current; for a second duration of time, disable the (compensation) adjustments to the emulated current output value based on actual measurements of the supplied current; and control operation of a power converter that produces the output voltage based at least in part on the emulated output current value.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting switching power supplies. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
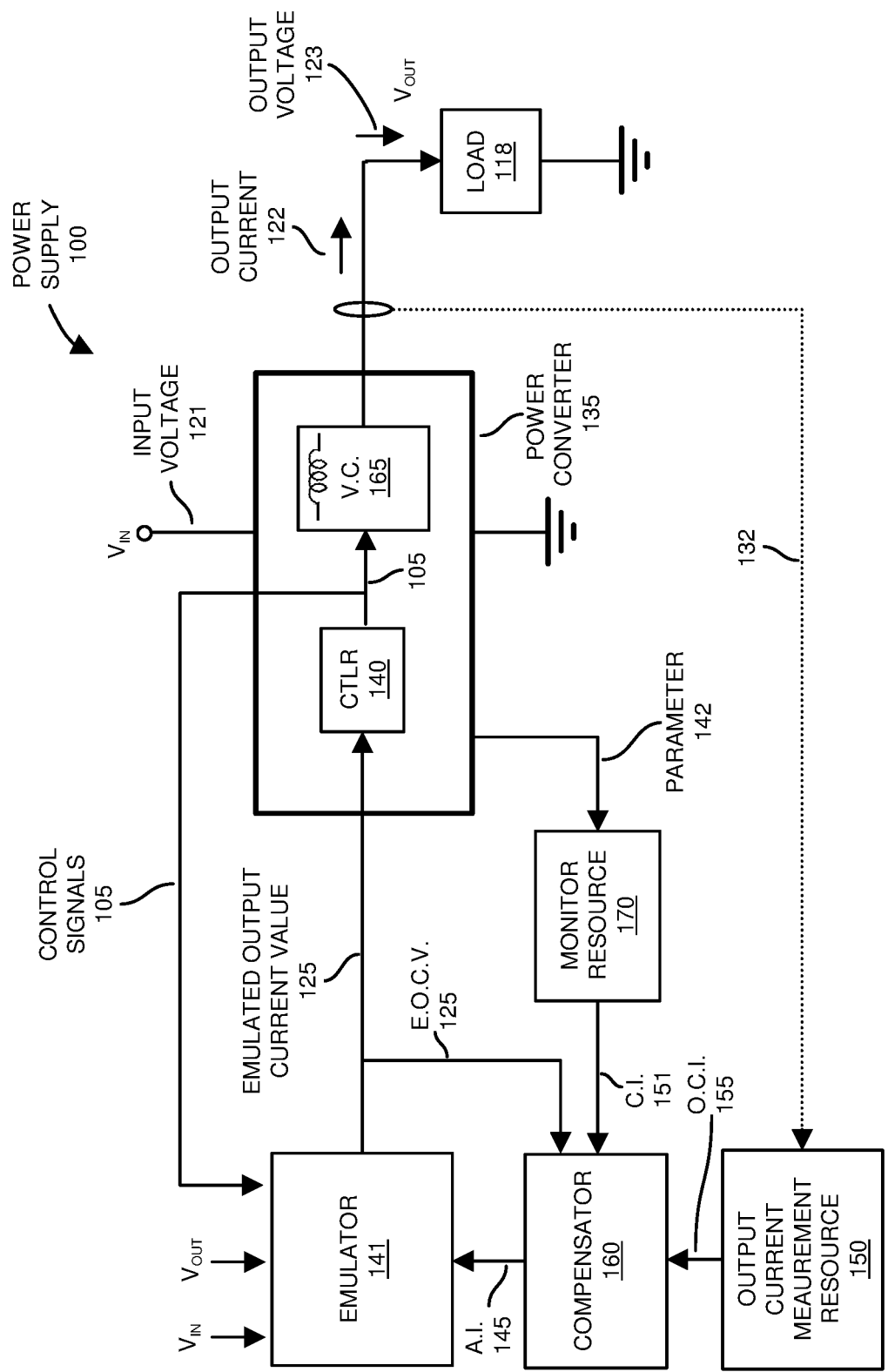
FIG. 1 is an example general diagram of a power supply supporting emulation and dynamic compensation according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Embodiments herein include an apparatus comprising an emulator and a corresponding compensator. During operation, the emulator produces, at different instants of time, an emulated output current value representative of an amount of current supplied from an output voltage to a load. The compensator provides selective compensation to the emulated output current value over time. For example, for a first time duration, the compensator enables (provides) compensation adjustments to the emulated output current value based on measurements of the supplied current. For a second duration of time, the compensator disables (prevents) the compensation adjustments to the emulated output current value based on measurements of the supplied current. In one embodiment, temporary disabling of the compensator and corresponding compensation adjustments during output current emulation provides more accurate generation of a respective emulated output current value, especially during transient conditions in which the load experiences a change in current consumption.

Now, more specifically, FIG. 1 is an example general diagram of a power supply supporting output current emulation and dynamic compensation according to embodiments herein.

In this example embodiment, the power supply 100 includes power converter 135, monitor resource 170, emulator 141, compensator 160, and output current measurement resource 150. Power converter 135 includes controller 140 and voltage converter 165.

As shown, output current measurement resource 150 receives one or more signals 132 (such as feedback signals associated with the voltage converter 165). Via the one or more signals 132, as its name suggests, the output current measurement resource 150 physically measures the output current 122 supplied by the output voltage 123 to the load 118.

In one embodiment, based on the signals 132, the output current measurement resource 150 produces output current information 155 indicating a magnitude of the output current 122. The output current measurement resource 150 is or includes one or more analog-to-digital converters to measure a voltage across the respective inductor in the voltage converter 165.

The output current measurement resource 150 includes one or more analog-to-digital converters and corresponding circuitry that produces the actual sample measurements of the current supplied by the output voltage 123 to the load 118. This can include measuring the voltage across the inductor (such as inductor 325 in FIG. 3) of the corresponding power converter 165 and implementing DCR measurements. Any alternative type of physical measurements can be implemented to detect a magnitude or change in magnitude of the output current 122

As its name suggests, monitor resource 170 monitors one or more parameters 142 associated with the power supply 100. In one embodiment, the monitor resource 170 monitors the power supply 100 for transient output current conditions such as when the load 118 experiences a sudden increase or decrease in output current 122, e.g., above or below a threshold value. This can include monitoring of the control signals 105 or other suitable entity.

Based on a detected trigger condition indicating a respective transient condition, the monitor resource 170 produces control information 151. In one embodiment, control information 151 includes a signal indicating a window of time when a transient (output current) condition occurs. As further discussed below, the control information 151 controls when the emulator 141 will use the output current information 155 as a basis to correct or provide compensation to the emulated output current value 125.

More specifically, in one nonlimiting example embodiment, compensator 160 receives the control information 151 indicating the window of time when the transient output current condition occurs. Additionally, the compensator 160 receives the emulated output current value 125 produced by the emulator 141. Based on a combination of the output current information 155, control information 151, and the emulated output current value 125, the compensator 160 produces adjustment information 145 outputted to the emulator 141.

As further shown, emulator 141 receives the adjustment information 145, state information of control signals 105, state information of output voltage Vout, state information of input voltage Vin. Based on such input, the emulator 141 produces the emulated output current value 125 transmitted to the controller 140.

As further discussed herein, the controller 140 140 uses the emulated output current value 125 as a basis to control operation of the voltage converter 165 in power supply 100.

In accordance with further example embodiments, during operation, the emulator 141 produces, at different instants of time, an emulated output current value 125 (estimate) representative of an amount of output current 122 supplied from an output voltage 123 to a dynamic load 118. As previously discussed, the compensator 160 provides compensation (via adjustment information 145) to the emulated output current value 125 over time. For example, in one embodiment, for a first time duration (such as when the load 118 consumes a substantially constant or a steady state amount of current), the compensator 160 inputs adjustment information 145 (derived from output current information 150) to the emulator 141. As further discussed herein, during the first window of time, the emulator 141 uses the adjustment information 145 (such as derived from physical measurements of the output current 122) to adjust the emulated output current value 125.

For a second duration of time, such as during transient conditions as indicated by the control information 151, the emulator 141 temporarily discontinues using or does not receive adjustment information 145 to generate the emulated output current value 125. In such an instance, the emulator 141 does not generate the emulated supplied current value 125 based on measurements of the supplied current (such as adjustment information 145) as indicated by the output current measurement resource 150. Instead, the emulator 141 generates the emulated output current value 125 based on states of control signals 105 and the measured input voltage Vin and measured output voltage Vout.

As further discussed herein, discontinued use of or disabling of compensation (such as adjustment information 145 derived from output current information 155) provided by the compensator 160 in one or more windows of time provides more accurate generation of a respective emulated output current value 125, especially during transient conditions in which the load 118 experiences a change in output current 122 consumption.

Figure 2:
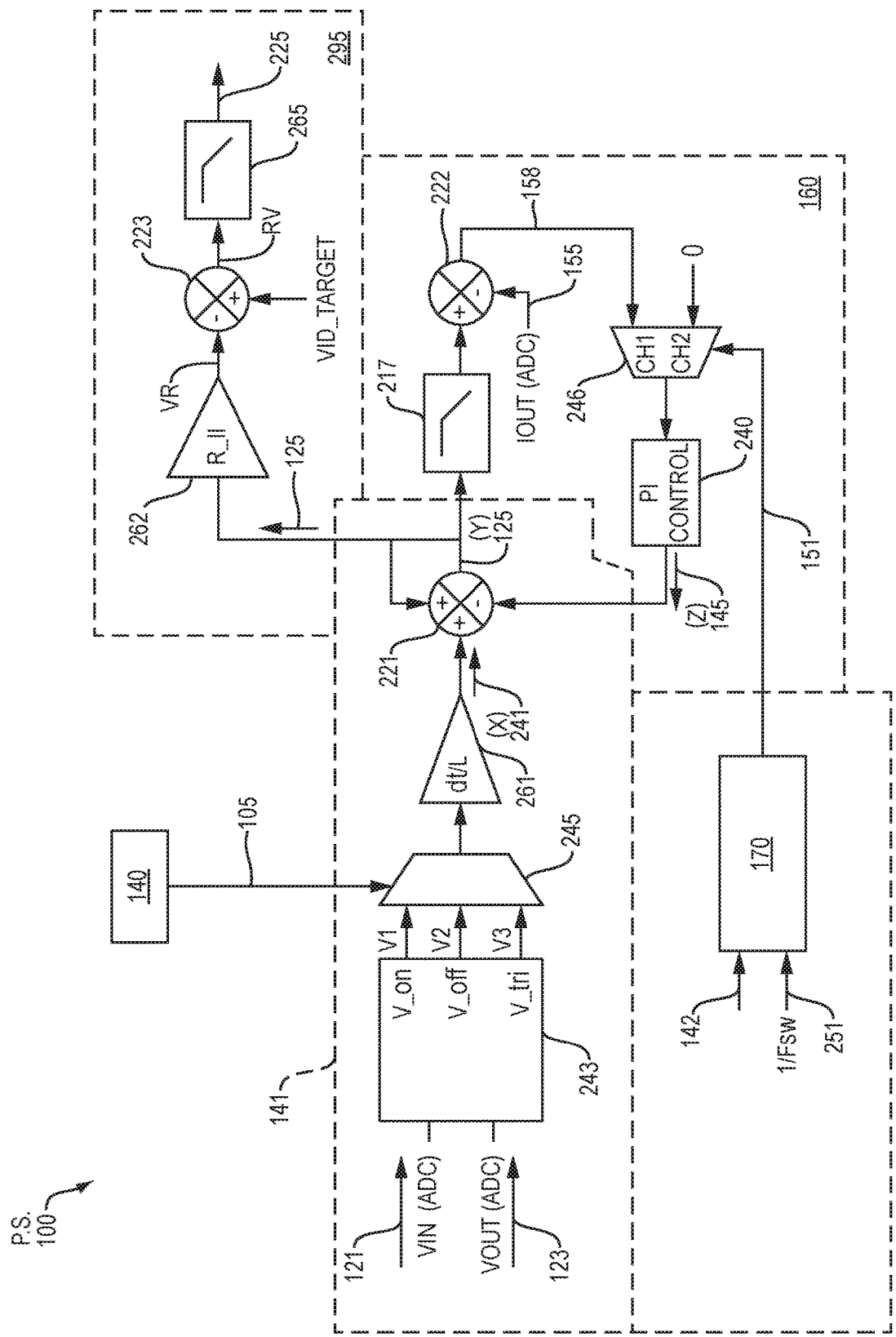
FIG. 2 is an example diagram illustrating an emulator and related components according to embodiments herein.

FIG. 2 is an example diagram illustrating an emulator and related components according to embodiments herein.

As shown, and as previously discussed, the power supply 100 includes emulator 141, monitor resource 170, and compensator 160. Power supply 100 further includes reference voltage generator 295.

In this example embodiment, emulator 141 includes voltage generator 243, mux 245, amplifier 261, and summer 221 (such as a digital summer). In one embodiment, the emulator 141 is a digital circuit that operates off of a respective sample clock. As further discussed herein, each clock signal causes the summer 221 to perform an addition (summation) function.

As further shown, compensator 160 includes multiple components including filter 217, summer 222, mux 246 (a.k.a., multiplexer), controller 240 (such as a PI or proportional-integral controller or other suitable resource).

In this example embodiment, the emulator 141 produces the emulated current output value 125 based on an inductance L (of inductor 325 in FIG. 3) of the voltage converter 165 (FIG. 1) converting the input voltage 121 into the output voltage 123.

More specifically, the emulator 141 includes voltage value generator 243 that produces different voltage values V1, V2, and V3 based on the magnitude of the input voltage 121 and the output voltage 123. For example, the voltage value generator 243 receives a magnitude of the input voltage 121 and a magnitude of the output voltage 123 and uses such information to produce voltage values V1 (where V1=Vin−Vout), V2 (where V2=0−Vout), and V3 (where V3=−Vd−Vout). Where Vd could be 0.5V.

The voltage converter 165 operates in one of 3 different switching states as indicated by the control signals 105. Controls signals 105 control a state of mux 245.

Figure 3:
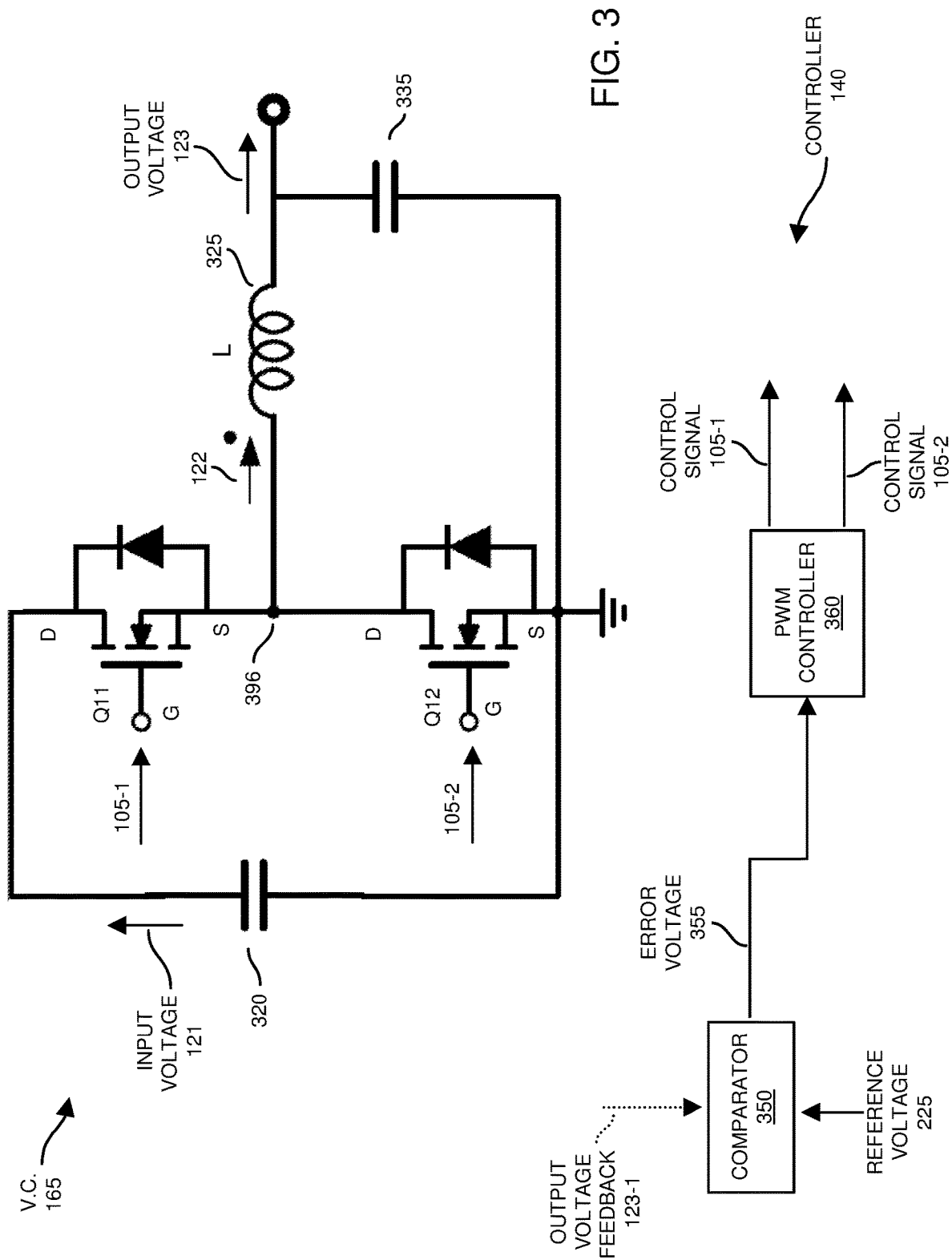
FIG. 3 is an example diagram illustrating a power converter according to embodiments herein.

Based on settings of the control signals 105 (such as whether switch Q11 is ON, switch Q12 is ON, or both Q11 and Q12 are OFF in tri-state as shown and discussed in FIG. 3), the mux 245 of emulator 141 outputs a respective voltage value V1, V2, or V3 to the amplifier 261. Amplifier 261 applies a gain of dT/L (where dT is the sample period of operating each of the summers 221, 222, and 223 and L is the inductance of inductor 325 in FIG. 3) to the received voltage value (V1, V2, or V3) and produces respective inductor current emulation information 241 outputted to the summer 221 (such as a digital summer operating of the sample clock frequency, where dT is a period associated with the sample clock frequency).

As previously discussed, the emulator 141 uses the inductor current emulation information 241 (calculated change in current for each sample cycle or period) outputted from the amplifier 261 as a basis to produce the emulated output current value 125. More specifically, during transient current consumption conditions, the emulator 141 produces the emulated output current value 125 based on the inductor current emulation information 241 without compensation from the compensator 160. Conversely, during steady state current consumption conditions, the emulator 141 produces the emulated output current value 125 based on the inductor current emulation information 241 and compensation information (such as compensation adjustments 145) from the compensator 160.

When used during steady state conditions, via adjustments 145 generated by the compensator 160, the compensator 160 biases a magnitude of the emulated output current value 125 to generally track a magnitude of the actual measurements of the output current 122. The biasing (via adjustments 145) ensures that the emulated output current value 125 generally tracks the actual output current 122 supplied by the voltage converter 165 to the load 118.

As further shown, in one embodiment, compensation of the emulated output current value 125 depends on detection of trigger conditions monitored by the monitor resource 170. In this example embodiment, the monitor resource 170 detects transient conditions via comparison of the measured period 142 associated with the controls signals 105 to threshold value information 251. In response to detecting that the measured period (or frequency) of the control signals 105 is above and/or below respective threshold values, the monitor resource 170 produces control information 151 (one or more bits of control information).

Control information 151 controls whether compensator 160 provides compensation to the emulated output current value 125. For example, the summer 221 outputs the emulated output current value 125 to the filter 217. Summer 222 subtracts the output current information 155 (physical measurement of output current 122 using one or more slow analog-to-digital converters) from the filtered emulated output current value 125 to produce signal 158 inputted to the channel 1 of mux 246.

In this example embodiment, the control information 151 controls a state of the mux 246. During steady state conditions when the switching period is generally constant, the control information 151 sets the mux 246 to pass signal 158 of the channel 1 input of mux 246 to the controller 240. Conversely, during transient conditions, when the switching period crosses the one or more threshold values as specified by the threshold value information 251 indicating a transient, the control information 151 sets the mux 246 to channel 2, in which the value of zero from channel 2 is inputted to the controller 240.

The controller 240 receives the output of the mux 246 and produces adjustments 145 inputted to the summer 221. Summer 221 produces the emulated output current value 125 based on inductor current emulation information 241 (i.e., value X), emulated output current value 125 (i.e., value Y), and adjustment information 145 (i.e., Z) as follows:

$$Y(n+1)=Y(n)+X(n)-Z(n),$$

where n=previous sample period and n+1=the next sample period.

Depending on a state of the control information 151, the adjustment information 145 (value Z) is generally value 158 (when channel 1 of the mux 246 is selected) or a value of zero (when channel 2 of the mux 246 is selected) as fed through the (PI or Proportional Integral) controller 240. In this manner, the compensator 160 biases the setting of the emulated output current value 125 based on the measured current 122 (from output current information 155) during steady state conditions when the channel 1 of mux 246 is selected. The compensator 160 is prevented from biasing the setting of the emulated output current value 125 based on the measured current 122 (from output current information 155) during transient conditions when the channel 1 of mux 246 is selected.

In accordance with further example embodiments, the power supply 100 includes reference voltage generator 295 used for regulation of the output voltage 123. As shown, the amplifier 262 provides a gain of R_LL (Load-Line resistance value associated with the voltage converter 165) such that the output VR of the amplifier 262 is a value equal to the emulated output current value 125 times resistance R_LL of the voltage converter 165. Summer 223 produces reference voltage RV by subtracting the value VR from the VID_target value of the voltage converter 135. VID_target is a value indicating a baseline magnitude (setpoint) in which to regulate the output voltage 123. The voltage value VR provides adjustments to the reference voltage 225.

As further discussed below in FIG. 3, the voltage converter 165 regulates the output voltage 123 based on the reference voltage 225 generated by the reference voltage generator 295.

FIG. 3 is an example diagram illustrating a power converter according to embodiments herein.

In this non-limiting example embodiment, the voltage converter 165 is configured as a buck converter including voltage source 320 (providing input voltage 121), switch Q11, switch Q12, inductor 325, and output capacitor 335.

Although the voltage converter 165 in FIG. 3 is a buck converter configuration, note again that the voltage converter 165 can be instantiated as any suitable type of voltage converter and include any number of phases, providing regulation as described herein.

As shown, the switch Q11 of voltage converter 165 is connected in series with switch Q12 between the input voltage 120 and corresponding ground reference. The voltage converter 165 further includes inductor 325 extending from the node 396 to the output capacitor 335 and dynamic load 118.

Via switching of the switches Q11 and Q12 based on respective control signals 105-1 (applied to gate G of switch Q11) and 105-2 (applied to gate G of switch Q12), node 396 coupling the source (S) node of switch Q11 and the drain (D) node of switch Q12 provides output current 122 through the inductor 325, resulting in generation of the output voltage 123 powering the load 118.

In one embodiment, the controller 140 controls switching of the switches Q11 and Q12 based on one or more feedback parameters. For example, the controller 140 can be configured to receive output voltage feedback signal 123-1 derived from the output voltage 123 supplied to power the load 118 as previously discussed in FIG. 1. The output voltage feedback signal 123-1 can be the output voltage 123 itself or a proportional derivative thereof.

Referring again to FIG. 3, via the comparator 350, the controller 140 compares the output voltage feedback signal 123-1 (such as output voltage 123 itself or derivative, or proportional signal) to the reference voltage 225 (FIG. 2). As previously discussed, the reference voltage 225 is a desired setpoint in which to control a magnitude of the output voltage 123 during load-line regulation implemented by the power supply 100. Also, as previously discussed, during load-line regulation, a magnitude of the reference voltage 225 varies depending on the magnitude of the output current 122.

Based on comparison of the output voltage feedback signal 123-1 and the voltage reference 225, the comparator 350 produces a respective error voltage 355 based on the difference between the output voltage feedback signal 123-1 and the reference voltage 225. A magnitude of the error voltage 355 generated by the comparator 350 varies depending upon the degree to which the magnitude of the output voltage 123 is in or out of regulation (with respect to the reference voltage 225).

As further shown, the PWM (Pulse Width Modulation) controller 360 of the controller 140 controls operation of switching the switches Q11 and Q12 based upon the magnitude of the error voltage 355. For example, if the error voltage 355 indicates that the output voltage 123 (of the voltage converter 165) becomes less than a magnitude of the reference voltage 225, the PWM controller 360 increases a duty cycle or frequency of activating the high side switch Q11 (thus decreasing a duty cycle of activating the low-side switch Q12) in a respective switch control cycle.

Conversely, if the error voltage 355 indicates that the output voltage 123 (of the voltage converter 165) becomes greater than a magnitude of the reference voltage 225, the PWM controller 360 decreases a duty cycle or frequency of activating the high side switch Q11 (thus increasing a duty cycle of activating the low-side switch Q12) in a respective switching control cycle.

As is known in the art, the controller 140 controls each of the switches Q11 and Q12 ON and OFF at different times to prevent short-circuiting of the input voltage 121 to the ground reference voltage. For example, when the switch Q11 is activated to an ON state, the switch Q12 is deactivated to an OFF state. Conversely, when the switch Q11 is deactivated to an OFF state, the switch Q12 is activated to an OFF state. Note that the controller 240 implements a dead time between state ON-OFF and OFF-ON state transitions to prevent shorting of the input voltage 121 to the ground reference.

Via variations in the pulse with modulation of controlling the respective switches Q11 and Q12, the controller 140 controls generation of the output voltage 123 such that the output voltage 123 remains within a desired voltage range with respect to the reference voltage setpoint 225.

Figure 4:
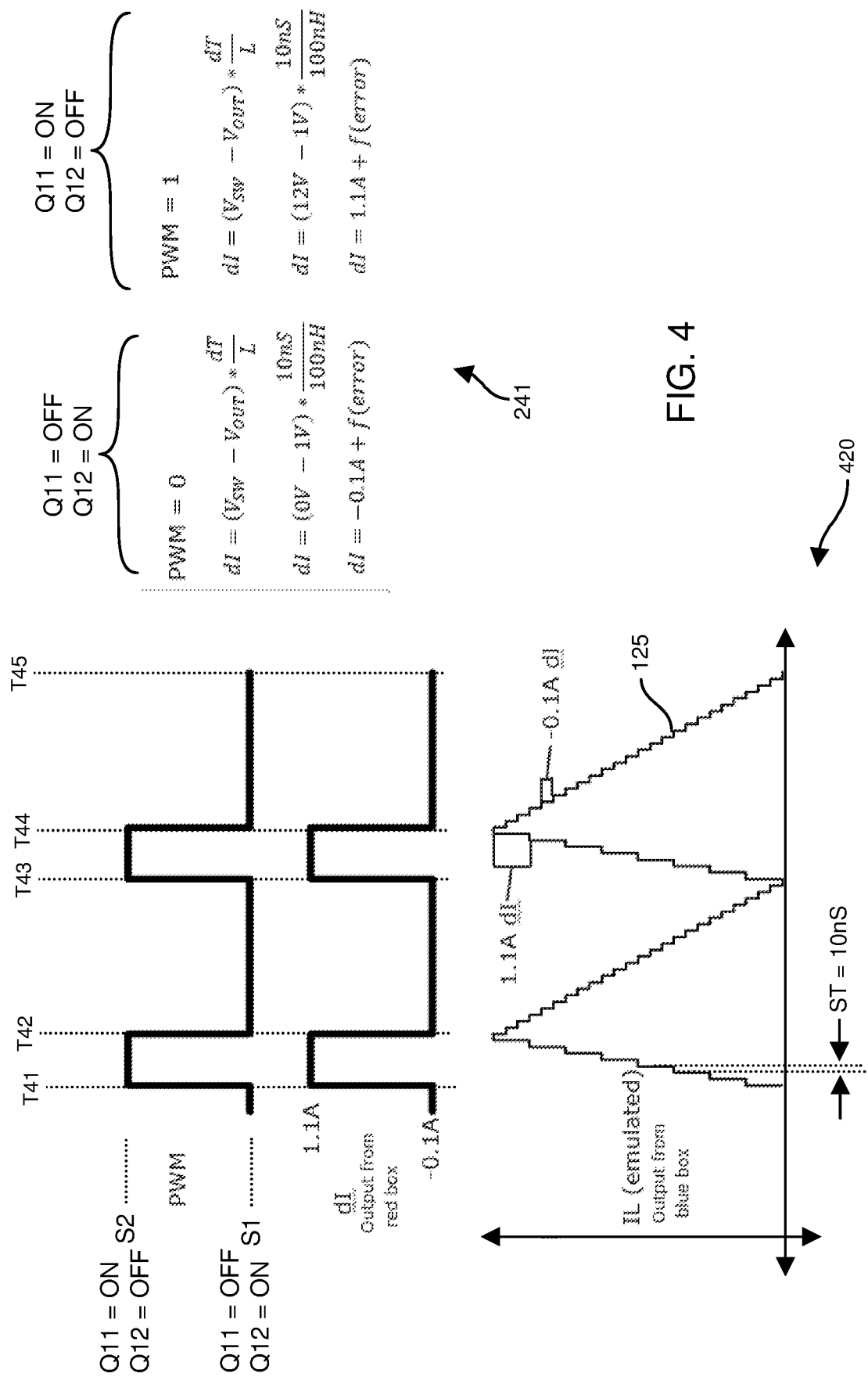
FIG. 4 is an example timing diagram illustrating sampling and corresponding generation of emulation information according to embodiments herein.

FIG. 4 is an example timing diagram illustrating sampling and corresponding generation of emulation information according to embodiments herein.

In this example embodiment, the pulse width modulation controller 360 generates controls signal 105 that drives respective switches Q11 and Q12 of the voltage converter 165.

When control signal 105 is logic high (such as when control signal 105-1 drives switch Q11 to an ON state and control signal 105-2 drives switch Q12 to an OFF state as indicated by state S2), the gain stage of 261 of the emulator 140 outputs inductor current emulation information 241 indicating the change in output current 122 for each sampling period (ST=10 nanoseconds) between time T41 and time T42 as being:

$$dI=(Vsw-Vout) \times dT/L$$

where dI=change in current for the sample period, Vsw=the voltage at node 396 (such as 12 VDC in this example because switch Q11 passes the input voltage to node 396), Vout=a magnitude of the output voltage 123 (such as 1 VDC in this example), dT=sample period (10 nanoseconds in this example), and L is the inductance of the inductor 325 (100 nano-henry in this example).

Accordingly, between time range T41 and T42, time range T43 and T44, etc., the emulator 140 produces the emulated output current value 125 (shown as monotonically increasing) in graph 420.

Conversely, when control signal 105 is logic low (such as when control signal 105-1 drives switch Q11 to an OFF state and control signal 105-2 drives switch Q12 to an ON state), the gain stage of 261 of the emulator 140 outputs inductor current emulation information 241 indicating the change in output current 122 for each sampling period (ST=10 nanoseconds) between time T42 and time T43 as being:

$$dI=(Vsw-Vout) \times dT/L$$

where dI=change in current, Vsw=the voltage at node 396 (such as 0VDC in this example because switch Q12 is ON), Vout=a magnitude of the output voltage 123 (such as 1 VDC in this example), dT=sample period (10 nanoseconds in this example), and L is the inductance of the inductor 325 (100 nanohenry in this example).

Accordingly, between time range T42 and T43, time range T44 and T45, etc., the emulator 140 produces the emulated output current value 125 (shown as monotonically decreasing) in graph 420.

If desired, as previously discussed, note that the emulator 140 can be configured to generate an appropriate delta I value for the output current 122 during a tristate condition (dead time) when both switch Q11 (a.k.a., high side switch circuitry or control switch circuitry) and switch Q12 (a.k.a., low side switch circuitry or synchronous switch circuitry) are both OFF.

Figure 5:
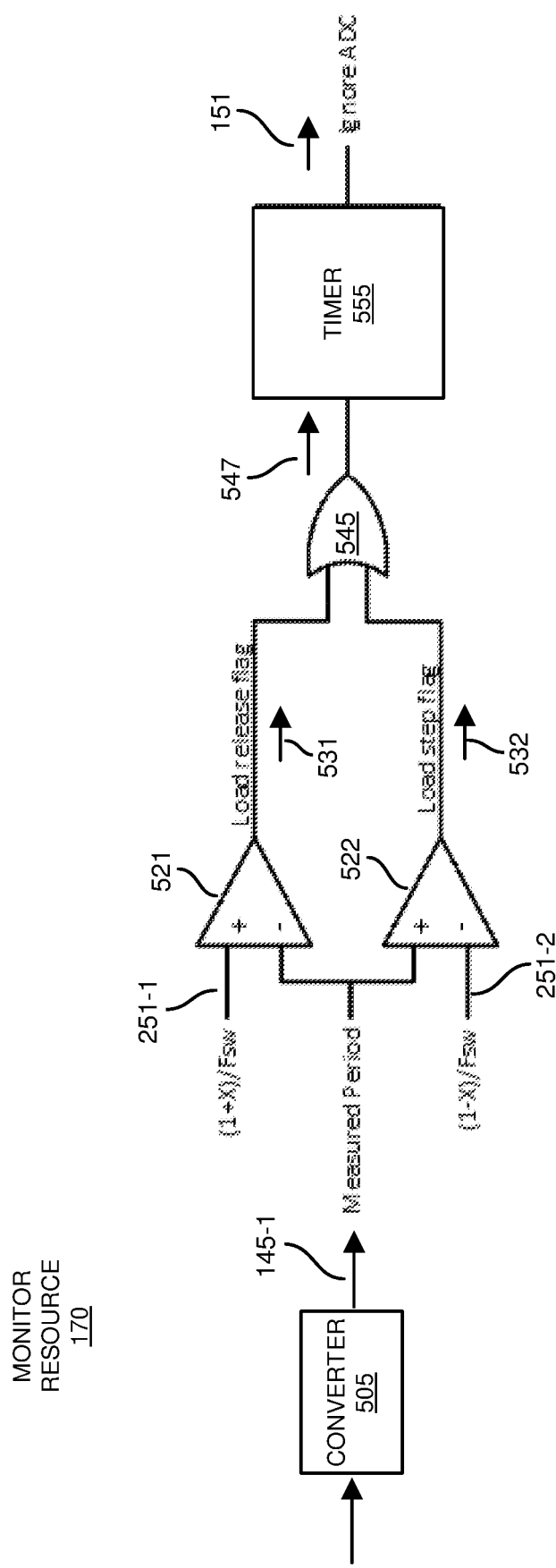
FIG. 5 is an example diagram illustrating implementation of a monitor resource and corresponding compensation control output according to embodiments herein.

FIG. 5 is an example diagram illustrating implementation of a monitor resource and corresponding compensation control output according to embodiments herein.

As previously discussed, in one embodiment, the voltage converter 165 operates in a constant ON-time control mode in which the high side switch circuitry (Q11) of the respective voltage converter 165 is set to a fixed value and the frequency (and period) of the control signals 105 varies depending on an amount of output current 122 needed to drive the load 118.

In this example embodiment, the monitor resource 170 monitors the period of the control signal 105 and compares it to each of two threshold values 251-1 and 251-2 (such as variable of fixed values) to determine a transient current consumption condition associated with the dynamic load 118.

For example, the converter 505 converts the control signal 105 into a measured period value 145-1 that is outputted to the comparators 251-1 and 251-2. If the magnitude of the signal 145-1 is greater than the threshold value 251-1, the comparator 521 sets signal 531 to a logic 1 indicating the load 118 release condition. This triggers signal 547 to go high, causing the counter 555 to produce control signal 151 to disable compensation associated with compensator 160.

Figure 7:
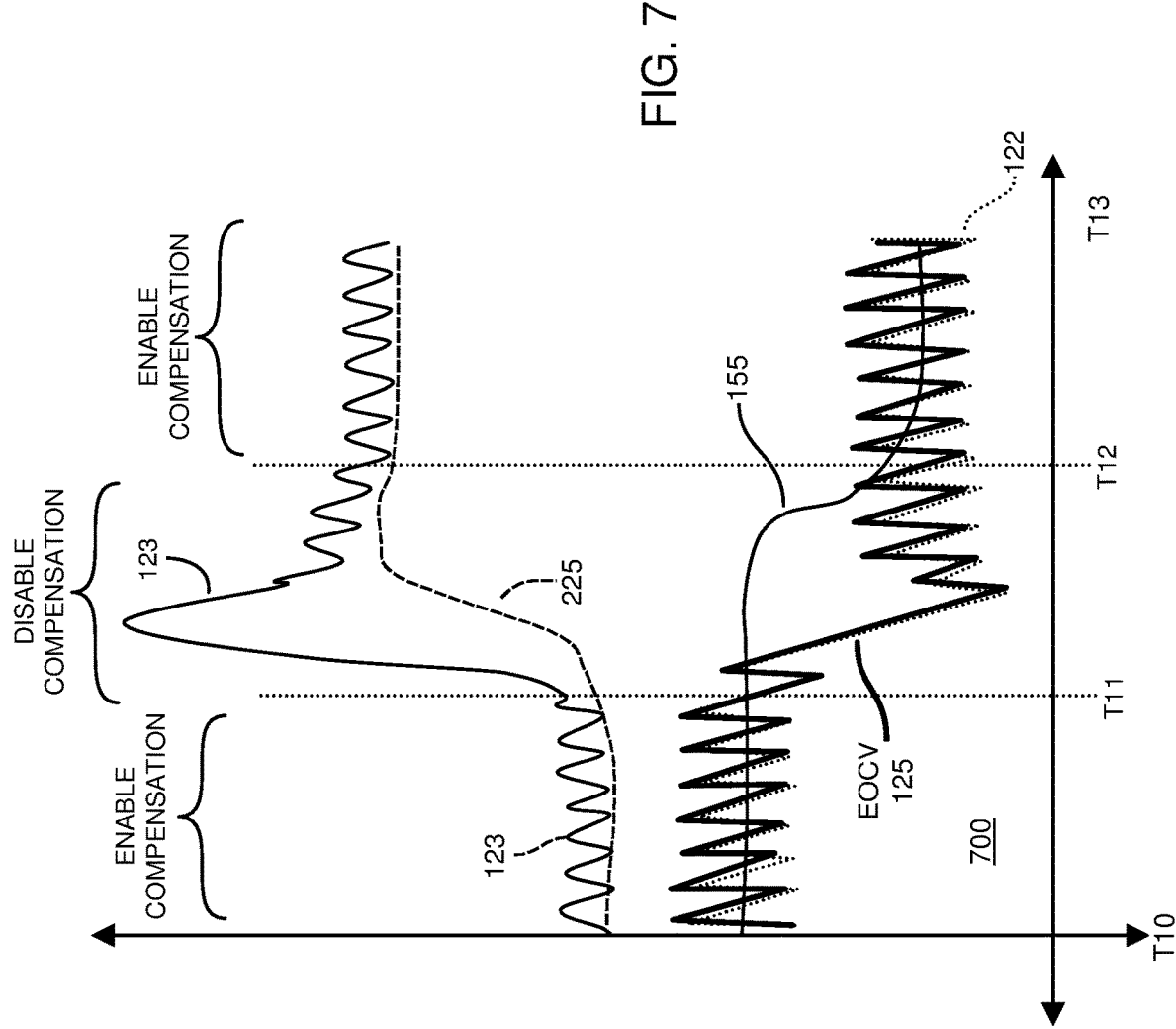
FIG. 7 is an example time diagram illustrating dynamic generation of an emulated output current value during transient and non-transient conditions according to embodiments herein.

In one embodiment, in response to detecting the trigger condition (load release such as shown in FIG. 7 at time T11), the timer 555 prevents the emulator 140 from generating the emulated output current value 125 based on the output current information 155 between time T11 and time T12 (FIG. 7). After the duration of time as controlled by timer 555, the timer 555 sets signal 151 back to a state in which the emulator 141 generates the emulated output current value 125 based at least in part again on the output current information 155 (such as analog-to-digital converter measured output current 122).

Figure 6:
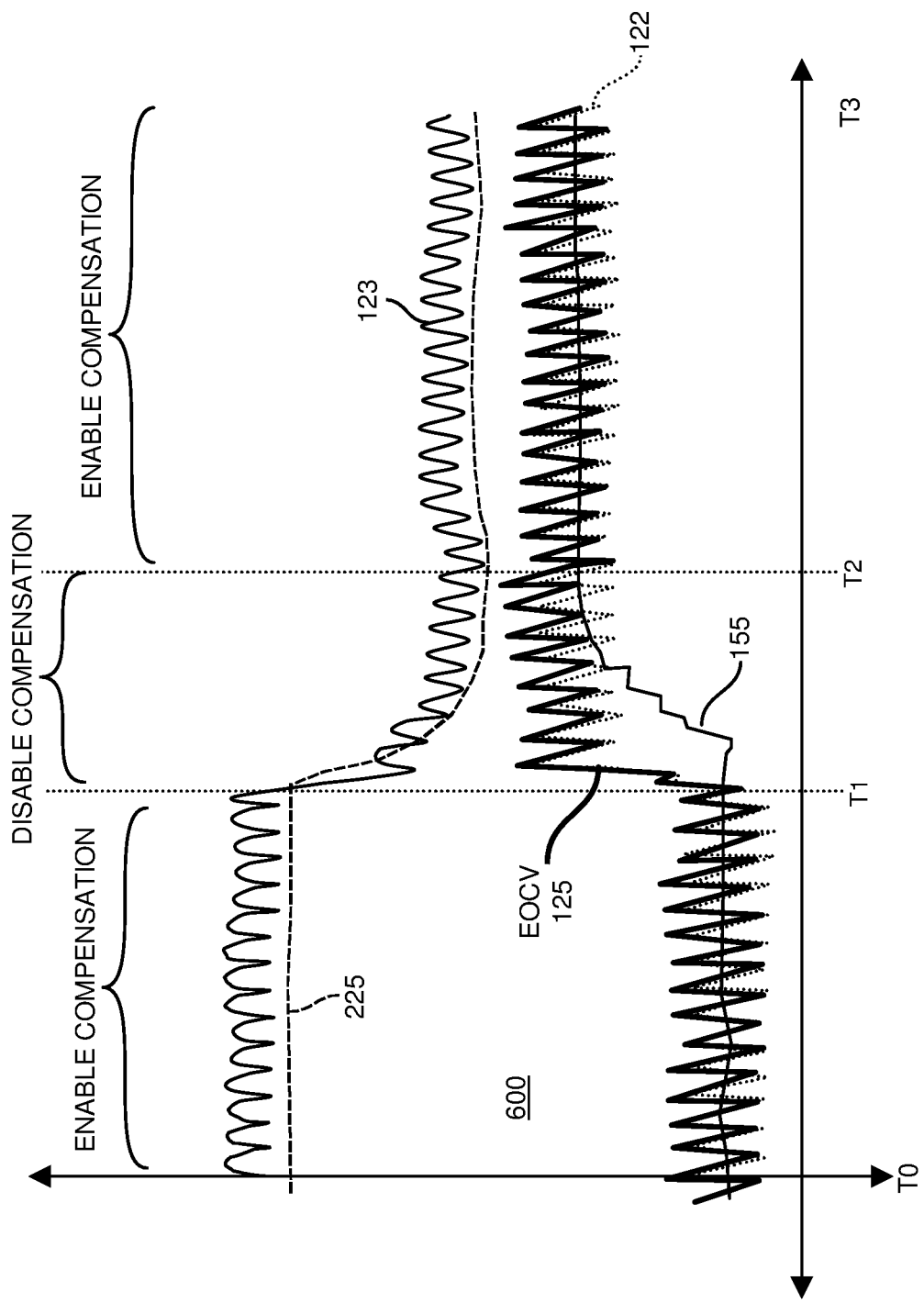
FIG. 6 is an example time diagram illustrating dynamic generation of an emulated output current value during transient and non-transient conditions according to embodiments herein.

Conversely, if the magnitude of the signal 145-1 is less than the threshold value 251-2, the comparator 522 sets signal 532 to a logic 1 indicating the load 118 step condition. This triggers signal 547 to go high, causing the counter 555 to produce control signal 151 to disable compensation. In one embodiment, in response to detecting the trigger condition (load step such as shown in FIG. 6 such as at time T1), the timer 555 prevents the emulator 140 from generating the emulated output current value 125 based on the output current information 155 between time T1 and time T2 (FIG. 6). After the duration of time as controlled by timer 555, the timer sets signal 151 back to a state in which the emulator 140 generates the emulated output current value 125 based at least in part again on the output current information 155 (such as analog-to-digital converter measured output current 122).

Thus, during transient conditions, and corresponding predetermined window of time, the emulator 140 produces a respective emulated output current value 125 based on pure emulation (such as without adjustments derived from output current information 155 representing the actual measurement of output current 122). The output current emulation and disabling of the compensator 160 in different windows of times provides a more accurate measurement of the output current 122, alleviating the need for a fast analog-to-digital converter (such as output current measurement resource 150) to physically measure the magnitude of the output current 122 and use such information as a basis to produce a respective output voltage 123.

In accordance with further example embodiments, the timer 555 can be configured to cause generation of the emulated current output value to be based on the actual measurements of the supplied current after an amount of time following the time duration (such as T1 to T2, T11 to T12, etc.) of disabling the adjustments from output current information 155.

FIG. 6 is an example time diagram illustrating dynamic generation of an emulated output current value during transient and non-transient conditions according to embodiments herein.

In this example embodiment, time duration 600 illustrates operation of the voltage converter 165 and emulator 140 over multiple instants and windows of time.

For example, between time T0 and time T1, the dynamic load 118 consumes a substantially fixed (or steady state) amount of current. In such an instance, between time T0 and time T1, the emulator 141 produces the emulated output current value 125 based on a combination of the inductor current emulation information 241 (derived from the measured input voltage 121, the measured output voltage 123, and the control signals 105) as well as the adjustment information 145 derived from the measured output current 155. In general, between time T0 and time T1 as shown, both the emulated output current value 125 and the actual output current 122 closely track the magnitude of the measured output current information 155. The controller 140 produces the output voltage 123 to track the reference voltage 225.

At or around time T1, assume that the dynamic load 118 substantially increases current consumption with respect to consumption in the time range between T0 and T1. In response to the detected transient increase in current consumption, the monitor resource 170 produces the control information 151 to disable compensation (or correction) provided by the compensator 160 and corresponding output current information 155 between time T1 and time T2. In such an instance, because compensation is disabled between time T1 and time T2, the emulator 141 produces the emulated output current value 125 based only on the inductor current emulation information 241 without compensation (correction) provided by the adjustment information 145. Thus, between time T1 and time T2, the emulated output current value 125 very closely tracks the actual output current 122, even though the output current information 155 (actual measured current 122) is not used to provide compensation/correction. Note that the output current information 155 (such as measured output current 122) from the output current measurement resource 150 does not closely track the actual output current 122 due to latency.

Eventually, at around time T2, after reaching a steady state again (such as substantially constant current consumption), the measured output current information 155 from the output current measurement resource 150 is a good representation of the actual output current 122 again. In such an instance, after the time duration (window of time) between T1 and T2, the monitor resource 170 generates the control signal 151 to enable compensation/correction again via the output current information 155. More specifically, between time T2 and time T3, the dynamic load 118 consumes a substantially fixed amount of current again. In such an instance, between time T2 and time T3, the emulator 141 produces the emulated output current value 125 based on a combination of the inductor current emulation information 241 (derived from the measured input voltage 121, the measured output voltage 123, and control signals 105) as well as the adjustment information 145 (derived from the measured output current 155). In general, between time T2 and time T3, both the emulated output current value 125 and the actual output current 122 closely track the magnitude of the measured output current information 155. As always, the controller 140 produces the output voltage 123 to track the reference voltage 225.

Thus, use of the emulated output current value 125 between time T1 and time T2 provides a more accurate reading of current supplied to the load 118.

FIG. 7 is an example time diagram illustrating dynamic generation of an emulated output current value during transient and non-transient conditions according to embodiments herein.

In this example embodiment, time duration 700 illustrates operation of the voltage converter 165 and emulator 140 over multiple instants of time.

For example, between time T10 and time T11, the dynamic load 118 consumes a substantially fixed amount of current. In such an instance, between time T10 and time T11, the emulator 141 produces the emulated output current value 125 based on a combination of the inductor current emulation information 241 (derived from the measured input voltage 121, the measured output voltage 123, and the control signals 105) as well as the adjustment information 145 derived from the measured output current 155. In general, between time T10 and time T11 as shown, both the emulated output current value 125 and the actual output current 122 closely track the magnitude of the measured output current information 155. The controller 140 produces the output voltage 123 to track the reference voltage 225.

At or around time T11, assume that the dynamic load 118 substantially decreases current consumption (e.g., so-called load release) with respect to consumption in the time range between T10 and T11. In response to the detected transient decrease in current consumption, the monitor resource 170 produces the control information 151 to disable compensation (or correction) provided by the compensator 160 and corresponding output current information 155 between time T11 and time T12. In such an instance, because compensation is disabled between time T11 and time T12, the emulator 141 produces the emulated output current value 125 based only on the inductor current emulation information 241 without compensation (correction) provided by the adjustment information 145. Thus, between time T11 and time T12, the emulated output current value 125 very closely tracks the actual output current 122, even though the output current information 155 (actual measured current 122) is not used to provide compensation/correction to the emulated output current value 125. Note that the output current information 155 from the output current measurement resource 150 does not closely track the actual output current 122 between time T11 and T12 due to latency.

Eventually, at around time T12, after reaching a steady state again, the measured output current information 155 from the output current measurement resource 150 is a good representation of the actual output current 122 again. In such an instance, after the time duration (window of time) between T11 and T12, the monitor resource 170 generates the control signal 151 to enable compensation/correction again via the output current information 155. More specifically, between time T12 and time T13, the dynamic load 118 consumes a substantially fixed amount of current again. In such an instance, between time T12 and time T13, the emulator 141 produces the emulated output current value 125 based on a combination of the inductor current emulation information 241 (derived from the measured input voltage 121, the measured output voltage 123, and control signals 105) as well as the adjustment information 145 (derived from the measured output current 155). In general, between time T12 and time T13, both the emulated output current value 125 and the actual output current 122 closely track the magnitude of the measured output current information 155. As always, the controller 140 produces the output voltage 123 to track the reference voltage 225.

As previously discussed, embodiments herein are useful over conventional techniques. For example, disabling of adjustments to the emulated output current value 125 during transient conditions results in a more accurate output current value 125 that is subsequently used to control conversion of the input voltage 121 into the output voltage 123 providing faster transient response to change in the load 118.

Thus, use of the emulated output current value 125 between time T11 and time T12 provides a more accurate reading of current supplied to the load 118.

Figure 8:
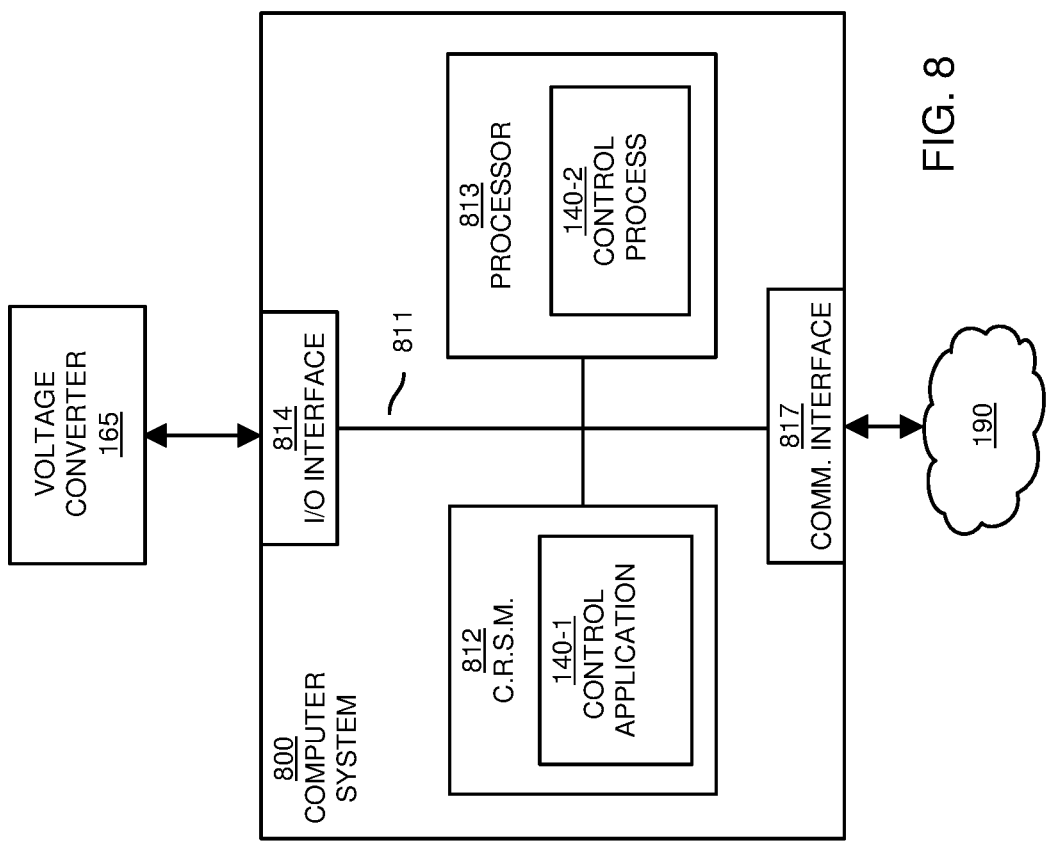
FIG. 8 is an example diagram illustrating computer processor hardware and related software instructions that execute methods according to embodiments herein.

FIG. 8 is an example block diagram of a computer device for implementing any of the operations as discussed herein according to embodiments herein.

As shown, computer system 800 (such as implemented by any of one or more resources such as controller 140, emulator 141, monitor resource 170, compensator 160, output current measurement resource 150, etc.) of the present example includes an interconnect 811 that couples computer readable storage media 812 such as a non-transitory type of media (or hardware storage media) in which digital information can be stored and retrieved, a processor 813 (e.g., computer processor hardware such as one or more processor devices), I/O interface 814, and a communications interface 817.

I/O interface 814 provides connectivity to any suitable circuitry such as power voltage converter 165.

Computer readable storage medium 812 can be any hardware storage resource or device such as memory, optical storage, hard drive, floppy disk, etc. In one embodiment, the computer readable storage medium 812 stores instructions and/or data used by the control application 140-1 to perform any of the operations as described herein.

Further in this example embodiment, communications interface 817 enables the computer system 800 and processor 813 to communicate over a resource such as network 190 to retrieve information from remote sources and communicate with other computers.

As shown, computer readable storage media 812 is encoded with control application 140-1 (e.g., software, firmware, etc.) executed by processor 813. Control application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in control application 140-1 stored on computer readable storage medium 812.

Execution of the control application 140-1 produces processing functionality such as control process 140-2 in processor 813. In other words, the control process 140-2 associated with processor 813 represents one or more aspects of executing control application 140-1 within or upon the processor 813 in the computer system 800.

In accordance with different embodiments, note that computer system 800 can be a micro-controller device, logic, hardware processor, hybrid analog/digital circuitry, etc., configured to control a power supply and perform any of the operations as described herein.

Functionality supported by the different resources will now be discussed via flowchart in FIG. 9. Note that the steps in the flowcharts below can be executed in any suitable order.

Figure 9:
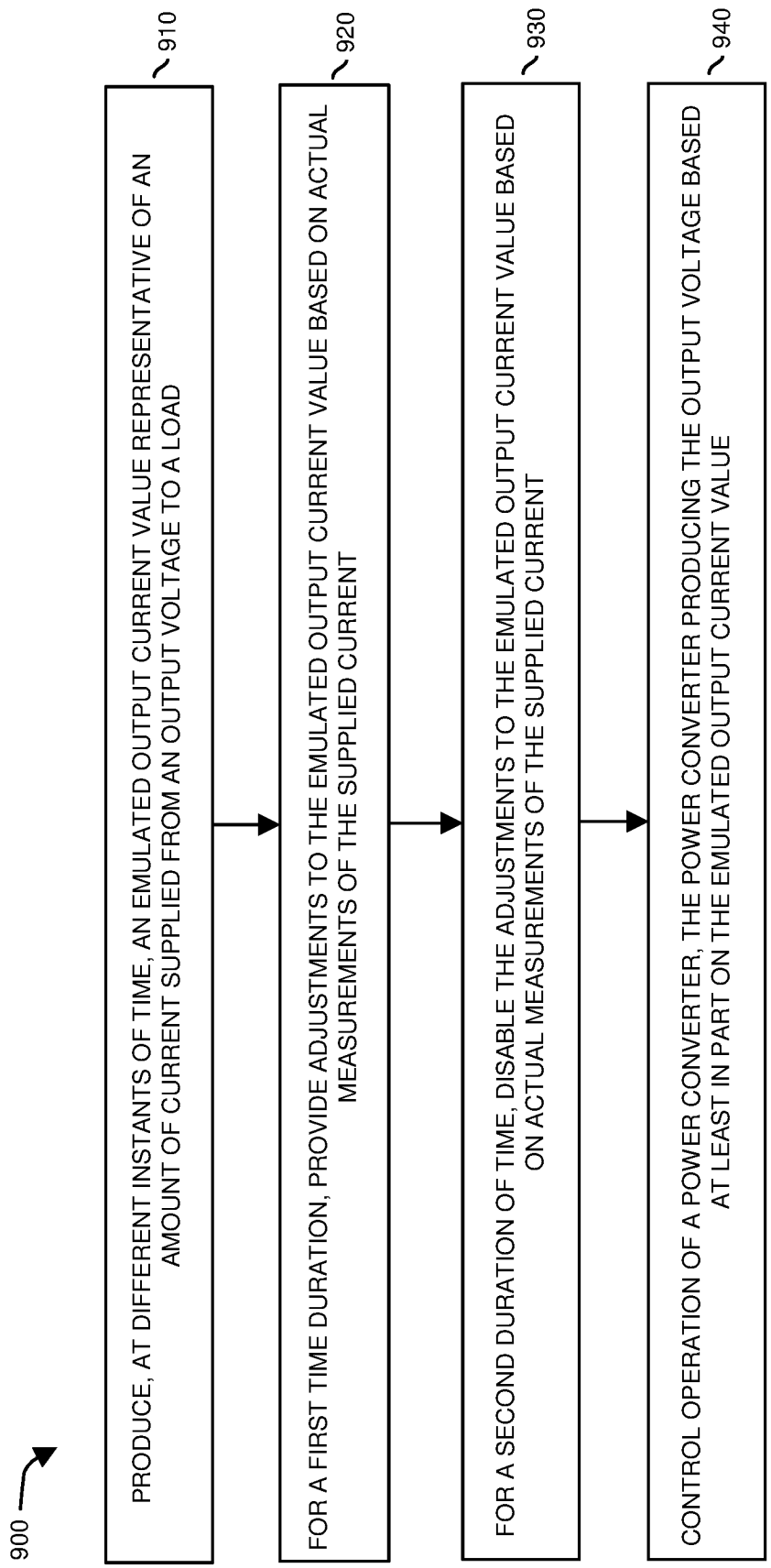
FIG. 9 is an example diagram illustrating a method according to embodiments herein.

FIG. 9 is an example diagram illustrating a method of controlling a power converter according to embodiments herein.

In processing operation 910, the emulator 141 produces, at different instants of time, an emulated output current value 125 representative of an amount of current supplied from an output voltage 123 to the load 118.

In processing operation 920, for a first time duration, the compensator 160 applies adjustments (such as adjustment information 145) to the emulated output current value 125 based on actual measurements of the supplied current 122.

In processing operation 930, for a second duration of time, the compensator 160 disables adjustments (such as adjustments 145) to the emulated output current value 125 based on actual measurements of the supplied current 122.

In processing operation 940, the controller 140 controls operation of the power converter, the power converter producing the output voltage 123 based at least in part on the emulated output current value 125.

Figure 10:
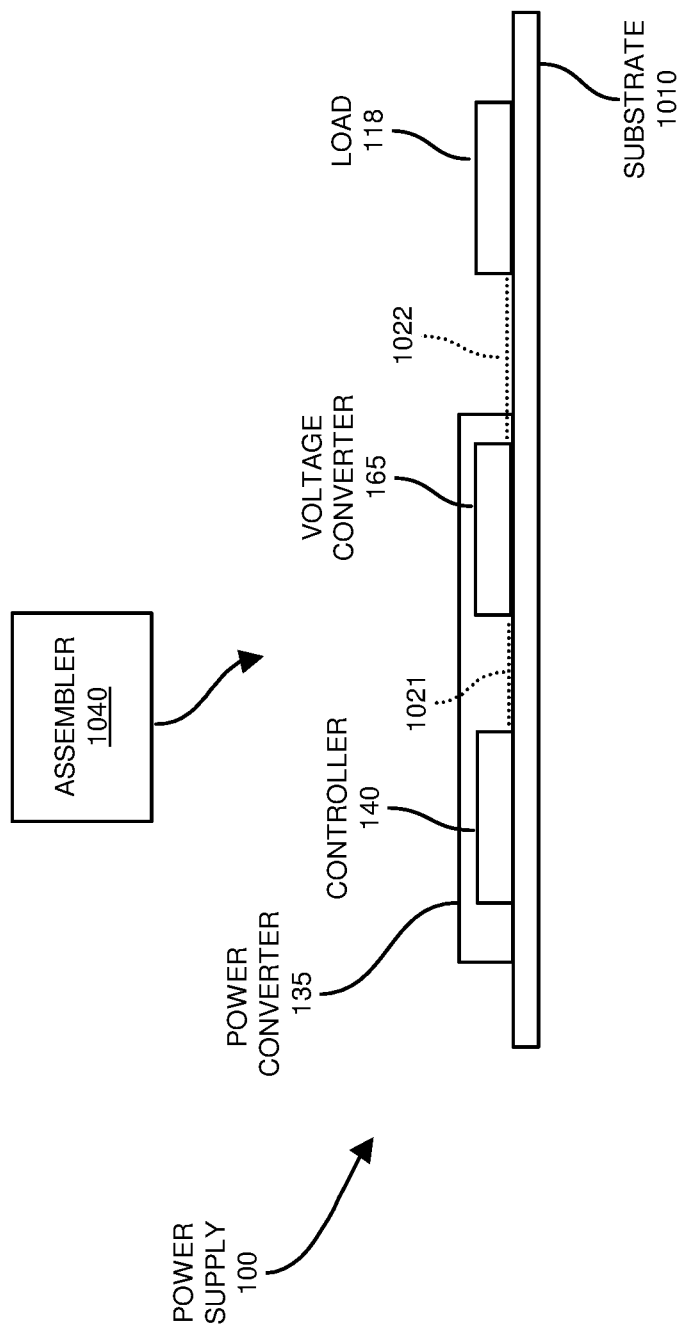
FIG. 10 is an example diagram illustrating fabrication of a circuit according to embodiments herein.

FIG. 10 is an example diagram illustrating assembly of a power converter circuit on a circuit board according to embodiments herein.

In this example embodiment, assembler 1040 receives a substrate 1010 (such as a circuit board).

The assembler 1040 further affixes (couples) the controller 140 and voltage converter 165 (and corresponding components such as emulator 141, compensator 160, output current measurement resource 150, monitor resource 170, etc., associated with the power converter 135) to the substrate 1010.

Via circuit paths 1021 (such as one or more traces, electrical conductors, cables, wires, etc.), the assembler 1040 couples the controller 140 to the voltage converter 165. Note that components such as the controller 140, voltage converter 165, and corresponding components such as emulator 141, compensator 160, output current measurement resource 150, monitor resource 170, etc., associated with the power converter 135 can be affixed or coupled to the substrate 1010 in any suitable manner. For example, one or more of the components in power supply 100 can be soldered to the substrate, inserted into sockets on the substrate 1010, etc.

Note further that the substrate 1010 is optional. Circuit paths 1022 may be disposed in cables providing connectivity between the power converter 135 and the load 118.

In one nonlimiting example embodiment, the load 118 is disposed on its own substrate independent of substrate 1010; the substrate of the load 118 is directly or indirectly connected to the substrate 1010. The controller 140 or any portion of the power converter 135 can be disposed on a standalone smaller board plugged into a socket of the substrate 1010.

Via one or more circuit paths 1022 (such as one or more traces, cables, connectors, wires, conductors, electrically conductive paths, etc.), the assembler 1040 couples the voltage converter 165 to the load 118. In one embodiment, the circuit path 1022 conveys the output voltage 123 generated from the voltage converter 165 to the load 118.

Accordingly, embodiments herein include a system comprising: a substrate 1010 (such as a circuit board, standalone board, mother board, standalone board destined to be coupled to a mother board, host, etc.); a voltage converter 165 including corresponding components as described herein; and a load 118. As previously discussed, the load 118 is powered based on conveyance of output voltage 123 and corresponding current 122 conveyed over one or more circuit paths 1022 from the voltage converter 165 to the load 118.

Note that the load 118 can be any suitable circuit or hardware such as one or more CPUs (Central Processing Units), GPUs (Graphics Processing Unit) and ASICs (Application Specific Integrated Circuits such those including one or more Artificial Intelligence Accelerators), which can be located on the substrate 1010 or disposed at a remote location.

Note again that techniques herein are well suited for use in circuit applications such as those that implement power conversion. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
producing, at different instants of time, an emulated output current value representative of an amount of current supplied from an output voltage to a load;
for a first time duration, applying adjustments to the emulated output current value based on actual measurements of the supplied current;
for a second time duration, producing the emulated output current value without adjustments derived from the actual measurements of the supplied current;
controlling operation of a power converter, the power converter producing the output voltage based at least in part on the emulated output current value; and
wherein producing the emulated output current value without adjustments to the emulated output current value during the second time duration includes: disabling application of the adjustments to the emulated output current value during the second time duration, the application of the adjustments disabled in the second time duration based on a magnitude of the current supplied from the output voltage to the load.

2. A method comprising:
producing, at different instants of time, an emulated output current value representative of an amount of current supplied from an output voltage to a load;
for a first time duration, applying adjustments to the emulated output current value based on actual measurements of the supplied current;
for a second time duration, producing the emulated output current value without adjustments derived from the actual measurements of the supplied current; and
controlling operation of a power converter, the power converter producing the output voltage based at least in part on the emulated output current value, the method further comprising:
disabling application of the adjustments to the emulated output current value during the second time duration in response to detecting a trigger condition in which the load powered by the output voltage experiences a transient current consumption condition.

3. A method comprising:
producing, at different instants of time, an emulated output current value representative of an amount of current supplied from an output voltage to a load;
for a first time duration, applying adjustments to the emulated output current value based on actual measurements of the supplied current;

for a second time duration, producing the emulated output current value without adjustments derived from the actual measurements of the supplied current; and controlling operation of a power converter, the power converter producing the output voltage based at least in part on the emulated output current value, the method further comprising:

monitoring a frequency of controlling operation of the power converter that produces the output voltage; and disabling application of the adjustments to the emulated output current value in response to detecting a change in the frequency.

4. The method as in claim 1 further comprising:

during both the first time duration and the second time duration: deriving a reference voltage setpoint signal based on a magnitude of the emulated output current value; and via the power converter, regulating generation of the output voltage based on the reference voltage setpoint signal.

5. The method as in claim 1, wherein the power converter implements load-line regulation during conversion of an input voltage into the output voltage.

6. The method as in claim 1 further comprising:

utilizing the emulated output current value to control operation of the power converter, which operates in a constant ON-time control mode.

7. The method as in claim 1 further comprising:

deriving the emulated output current value from inductor current emulation information; and wherein providing adjustments to the emulated output current value during the first time duration includes: biasing a magnitude of the emulated output current value to track a magnitude of the actual measurements of the supplied current.

8. The method as in claim 7, wherein the inductor current emulation information specifies an estimated amount of output current to the load for each of multiple sample times.

9. The method as in claim 8 further comprising:

generating estimated changes in the amount of current supplied from the output voltage to the load for each of multiple sample times depending on switch control states applied to the power converter generating the output voltage.

10. The method as in claim 1, wherein producing the emulated output current value includes:

estimating changes in the amount of current supplied from inductor of the power converter to the load for each of multiple sample times; and deriving the emulated output current value from the estimated changes during the first time duration and the second time duration.

11. The method as in claim 1 further comprising:

implementing an analog-to-digital converter to produce the actual measurements of the supplied current; and wherein the emulated output current value is a more accurate representation of the amount of current supplied from the output voltage to the load than the actual measurements of the supplied current obtained via the analog-to-digital converter during the second time duration.

12. The method as in claim 1 further comprising:

implementing a timer that causes generation of the emulated output current value to be based on the actual measurements of the supplied current after an amount of time following the second time duration of disabling the adjustments.

13. The method as in claim 1 further comprising:

producing the emulated output current value based on an inductance of the power converter converting an input voltage into the output voltage.

14. An apparatus comprising:

an emulator operative to produce, at different instants of time, an emulated output current value representative of an amount of current supplied from an output voltage to a load;

a controller operative to regulate the output voltage based on the emulated output current value; and a compensator operative to:

i) for a first time duration, enable adjustments to the emulated output current value based on measurements of the supplied current; and ii) for a second time duration, disable adjustments to the emulated output current value based on measurements of the supplied current;

wherein the compensator is further operative to: disable the adjustments to the emulated output current value in response to detecting a trigger condition in which the load powered by the output voltage experiences a transient current consumption condition.

15. An apparatus comprising:

an emulator operative to produce, at different instants of time, an emulated output current value representative of an amount of current supplied from an output voltage to a load;

a controller operative to regulate the output voltage based on the emulated cutout current value; and a compensator operative to:

i) for a first time duration, enable adjustments to the emulated output current value based on measurements of the supplied current; and ii) for a second time duration, disable adjustments to the emulated output current value based on measurements of the supplied current;

a monitor resource operative to monitor a frequency of controlling operation of a power converter that produces the output voltage; and wherein the compensator is further operative to: disable the adjustments to the emulated output current value in response to detecting a change in the frequency.

16. The apparatus as in claim 14, wherein the compensator is further operative to:

during both the first time duration and the second time duration:

derive a reference voltage setpoint signal based on a magnitude of the emulated current output value; and regulate generation of the output voltage based on the reference voltage setpoint signal.

17. The apparatus as in claim 16, wherein the compensator is operative to implement load-line regulation during conversion of an input voltage into the output voltage.

18. The apparatus as in claim 14, wherein the compensator is further operative to:

utilize the emulated current output value to control operation of the power converter operating in a constant ON-time control mode, the power converter generating the output voltage based at least in part on a magnitude of the emulated output current value.

19. The apparatus as in claim 14, wherein the emulator is further operative to: derive the emulated current output value from inductor current emulation information; and wherein the compensator is further operative to, via the adjustments, bias a magnitude of the emulated current output value to track a magnitude of the actual measurements of the supplied current.

20. The apparatus as in claim 19, wherein the inductor current emulation information specifies estimated changes in the amount of current supplied from the output voltage to the load for each of multiple sample times.

21. The apparatus as in claim 20, wherein the emulator is further operative to:
generate estimated changes in the amount of current supplied from the output voltage to the load for each of multiple sample times depending on switch control states of the power converter generating the output voltage.

22. The apparatus as in claim 14, wherein the emulator is further operative to:
estimate changes in the amount of current supplied from the output voltage to the load for each of multiple sample times; and
derive the emulated current output value from the estimated changes during the first time duration and the second time duration.

23. The apparatus as in claim 14 further comprising:
an analog-to-digital converter operative to produce the actual measurements of the supplied current; and
wherein the emulated current output value is a more accurate representation of the amount of current supplied from the output voltage to the load than the actual measurements of the supplied current obtained via the analog-to-digital converter during the second time duration.

24. The apparatus as in claim 14 further comprising:
a timer operative to cause generation of the emulated current output value to be based on the actual measurements of the supplied current after an amount of time following the second time duration of disabling the adjustments.

25. The apparatus as in claim 14, wherein the emulator is further operative to:
produce the emulated current output value based on an inductance of the power converter converting an input voltage into the output voltage.

26. A system comprising:
a circuit substrate;
the apparatus of claim 14, the apparatus coupled to the circuit substrate; and
wherein the load is coupled to the substrate.

27. A method comprising:
receiving a circuit substrate; and
coupling the apparatus of claim 14 to the circuit substrate.

28. The apparatus as in claim 14, wherein the emulator is operative to produce a next sample of the emulated output current value based on a previous produced sample of the emulated output current value.

29. The apparatus as in claim 28, wherein the emulator is operative to, during the first time duration, produce the next sample of the emulated output current value based at least in part on a sample measurement of the current supplied from the output voltage.

30. The apparatus as in claim 28, wherein the emulator is operative to, during the second time duration, produce the next sample of the emulated output current value based at least in part on a sample measurement of the current supplied from the output voltage.

31. The apparatus as in claim 14, wherein the compensator is further operative to produce the adjustments for the first time duration based on a difference between a filtered adjustment signal derived from the emulated output current value and the measurements of the supplied current.

32. The apparatus as in claim 14, wherein the emulated output current value more closely tracks a magnitude of the supplied current during the second time duration than the measurements of the supplied current track the magnitude of the supplied current.

33. The apparatus as in claim 14, wherein the second time duration corresponds to a change in a magnitude of the output voltage as a result of a change in current consumption by the load.

34. The apparatus as in claim 14, wherein the compensator is further operative to: disable the adjustments to the emulated output current value during the second time duration in response to detecting a transient current consumption condition by the load; and
wherein the controller is operative to, during the second time duration, convert an input voltage into the output voltage via control of switches in a power converter.

35. An apparatus comprising:
an emulator operative to produce, at different instants of time, an emulated output current value representative of an amount of current supplied from an output voltage to a load;
a controller operative to regulate the output voltage based on the emulated output current value; and
a compensator operative to:
i) for a first time duration, enable adjustments to the emulated output current value based on measurements of the supplied current; and
ii) for a second time duration, disable adjustments to the emulated output current value based on measurement of the supplied current;
wherein the emulator is operative to, during the first time duration, produce a next sample of the emulated output current value based on: i) a previous sample of the emulated output current value, ii) a first measurement of the supplied current produced by the emulator, and iii) a first adjustment value derived at least in part from the previous sample of the emulated output current value.

36. The apparatus as in claim 15, wherein the controller is operative to change a frequency of controlling switches in the power converter to regulate the magnitude of the output voltage.

37. The method as in claim 1, wherein the power converter is operative to convert an input voltage into the output voltage;
wherein the actual measurements of the supplied current for the first time duration are derived from the output voltage; and
for the second time duration, producing the emulated output current value without adjustments based on the actual sample measurements of the supplied current derived from the output voltage.

38. The method as in claim 37, wherein a magnitude of the emulated output current value tracks a magnitude of the current supplied from the output voltage during the first time duration; and
wherein the magnitude of the emulated output current value continues to track the magnitude of the current supplied from the output voltage during the second time duration.

39. The apparatus as in claim 14, wherein the power converter is operative to produce the output voltage from an input voltage;

wherein the actual measurements of the supplied current for the first time duration are derived from the output voltage; and wherein the emulated output current value is produced for the second time duration without adjustments based on the actual sample measurements of the supplied current derived from the output voltage.

40. The apparatus as in claim 39, wherein a magnitude of the emulated output current value tracks a magnitude of the supplied current during the first time duration; and wherein the magnitude of the emulated output current value continues to track the magnitude of the supplied current during the second time duration.

\* \* \* \* \*

UNITED STATES PATENT AND TRADEMARK OFFICE
CERTIFICATE OF CORRECTION

| | |
|---|---|
| PATENT NO. | : 11,601,052 B2 |
| APPLICATION NO. | : 16/857450 |
| DATED | : March 7, 2023 |
| INVENTOR(S) | : Venkat Sreenivas et al. |

It is certified that error appears in the above-identified patent and that said Letters Patent is hereby corrected as shown below:

In the Claims

Column 20, Claim 15, Line 7, replace "cutout" with --output--

Column 22, Claim 35, Line 13/14, replace "measurement" with --measurements--

Signed and Sealed this
Ninth Day of April, 2024

Katherine Kelly Vidal
*Director of the United States Patent and Trademark Office*